UNITED STATES PATENT OFFICE.

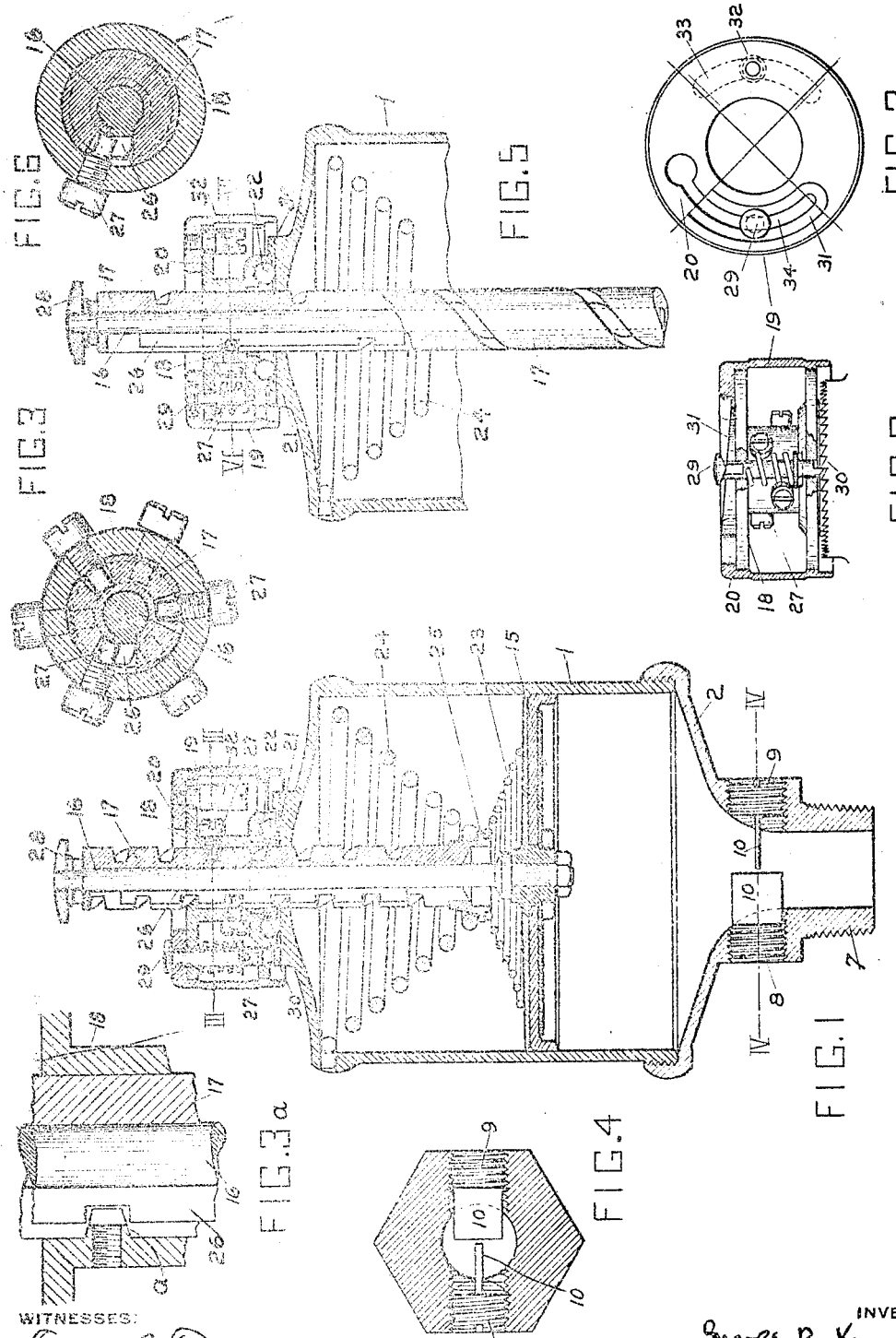

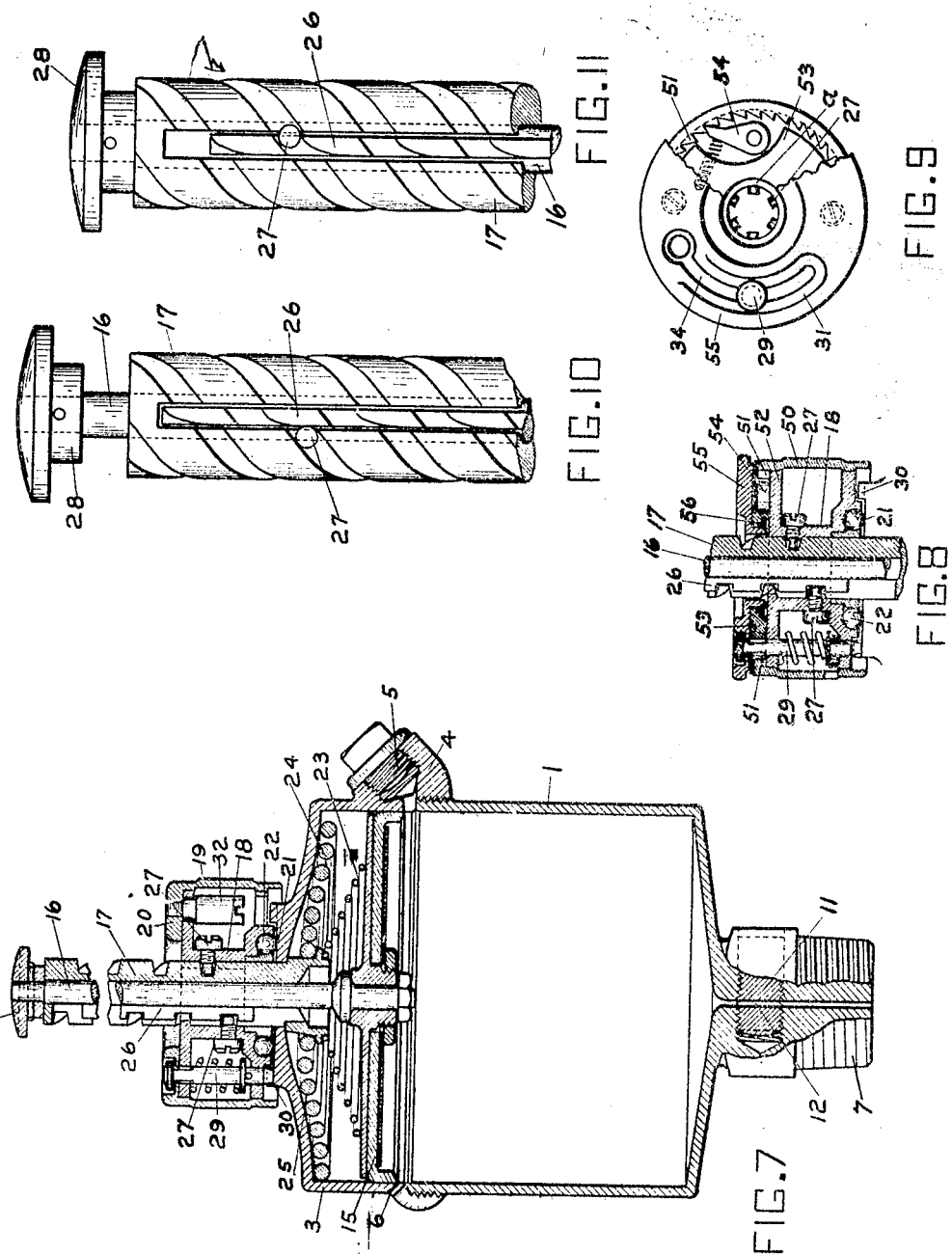

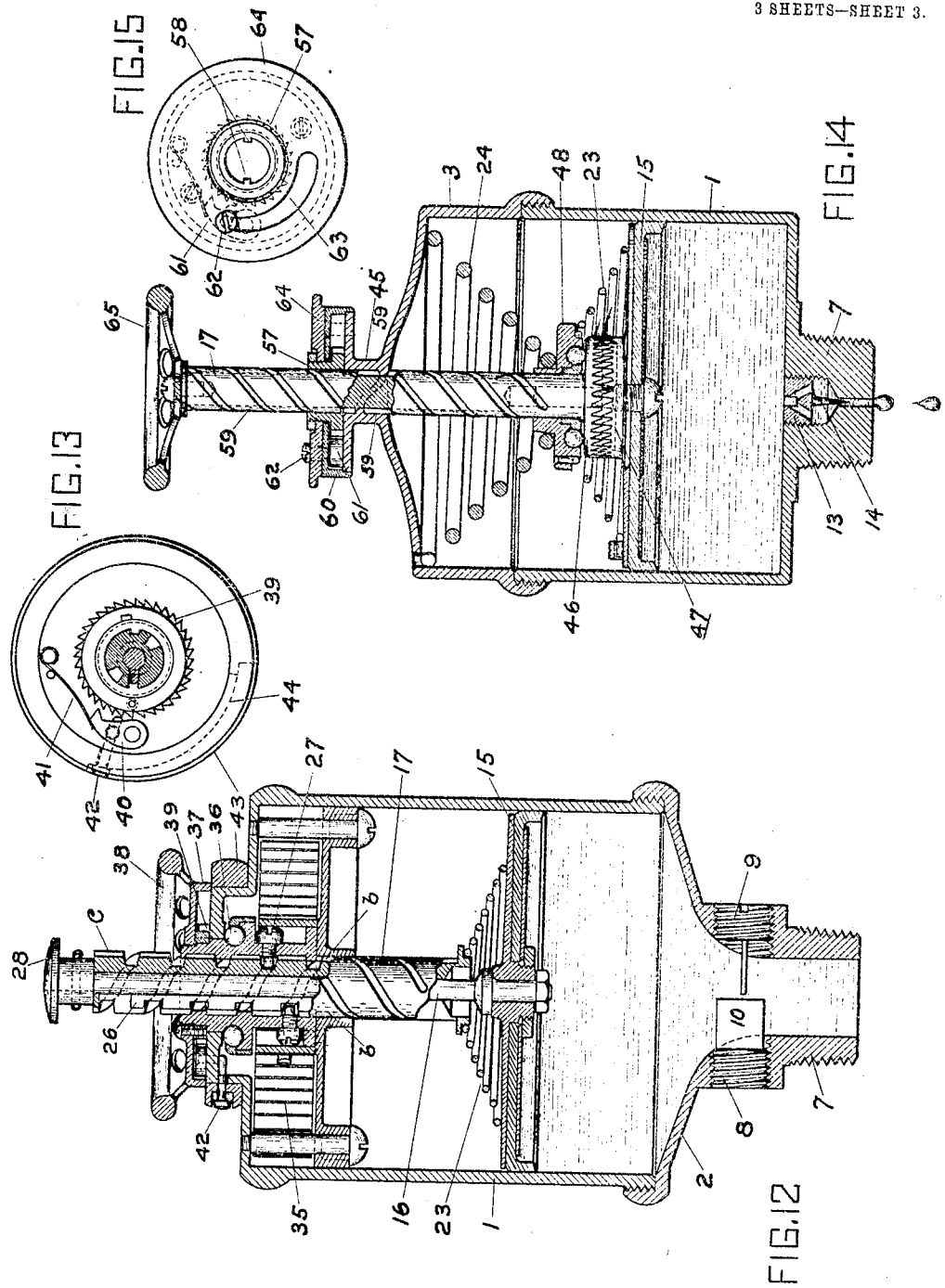

GEORGE RUSSELL KENNEDY, OF PITTSBURG, PENNSYLVANIA, ASSIGNOR OF ONE-HALF TO GRANT McCARGO, OF PITTSBURG, PENNSYLVANIA.

LUBRICATOR.

No. 906,720.  Specification of Letters Patent.  Patented Dec. 15, 1908.

Application filed May 25, 1908. Serial No. 434,983.

*To all whom it may concern:*

Be it known that I, GEORGE RUSSELL KENNEDY, residing at Pittsburg, in the county of Allegheny and State of Pennsylvania, a citizen of the United States, have invented or discovered certain new and useful Improvements in Lubricators, of which improvement the following is a specification.

The invention described herein relates to certain improvements in feed cups for lubricants requiring pressure to cause its flow or movement to the surface to be lubricated. The cups heretofore employed for this purpose employ either a spring or a weight for causing the flow of the lubricant. Both classes are however open to serious objections. Where springs are used, the feed pressure on the lubricant will vary with the expansion from a comparatively high pressure producing a rapid flow of lubricant, to a low feed pressure when the flow of lubricant will be insufficient. Cups employing a weight to feed the lubricant will cause a uniform flow provided the part of the machine to which the cup is attached is stationary. Any movement of the cup having a weight feed, especially when the movement is in a vertical plane, will produce irregularity of flow.

The invention described herein has for its object a construction of feed mechanism whereby a practically uniform pressure can be maintained at all times on the lubricant regardless of the quantity of lubricant in the cup and regardless of the use of the cup, i. e. whether it is attached to a stationary or movable part.

The invention is hereinafter more fully described and claimed.

In the accompanying drawings forming parts of this specification, Figure 1 is a sectional elevation of a lubricator embodying my improvements; Fig. 2 is a view partly in section and partly in elevation of the controlling nut at right angles to the plane of section in Fig. 1; Fig. 2ᵃ is a top plan view of a part of the nut; Figs. 3 and 4 are sectional plans on planes indicated by the lines III—III and IV—IV respectively in Fig. 1; Fig. 3ᵃ is a sectional detail view on an enlarged scale showing portions of the nut and shaft; Fig. 5 is a sectional elevation of the upper portion of a lubricator, illustrating a modification of the structure shown in Fig. 1; Fig. 6 is a sectional plan on a plane indicated by the line VI—VI Fig. 5; Fig. 7 is a view similar to Fig. 1 and shows certain modifications; Fig. 8 is a sectional elevation illustrating certain modifications of the controlling nut; Fig. 9 is a top plan view of the nut shown in Fig. 8; Figs. 10 and 11 show elevations of the shaft and locking rod in different operative positions; Figs. 12 and 14 are views similar to Fig. 1, and illustrate further modifications of my improvement; Fig. 13 is a top plan of the nut reversing means shown in Fig. 12, the top plate being removed; and Fig. 15 is a plan view of the shaft reversing device shown in Fig. 14.

In the practice of my invention the cup 1 is made cylindrical as is customary, and has a removable bottom 2 threaded onto the body as shown in Fig. 1, or with a removable cap-shaped cover 3 screwing into the upper end of the body as shown in Figs. 7 and 14. This cap is made with an internal diameter approximately equal to that of the cup, and of sufficient depth to reserve and protect the plunger when withdrawn from the cup. When the lubricant is sufficiently stiff, the cup can be removed from the bottom 2, or the cap 3 can be removed for filling the cup. For a more plastic lubricant the cup may be provided with a filling nozzle 4, internally threaded for the reception of the closing plug 5 as shown in Fig. 7. When filling through the nozzle 4, a vent 6 for the escape of air is desirable. The bottom of the cup is provided with a threaded discharge nozzle 7 as is customary. The opening through this nozzle is made large enough for the maximum discharge desired, and suitable means are provided for restricting such discharge opening. In Fig. 1 is shown a butterfly construction consisting of threaded plugs 8 and 9 provided with their flat extensions 10. These plugs are screwed into diametrically arranged holes through the walls of the nozzle 7, the portions 10 projecting across the opening in the nozzle and nearly meeting, as will be seen by reference to Figs. 1, 4 and 12. These portions 10 are made of such dimensions relative to the discharge opening that when arranged horizontally they will reduce such opening to the smallest desired extent. By shifting one or both of the plates 10 to a position at an angle to a transverse plane through the nozzle, the size of the discharge opening can be increased as desired. In lieu of this construction I may employ a threaded plug 11 as shown in Fig. 7, arranged transverse of the discharge opening in the nozzle, and provided with a transverse port 12. By shifting this plug angularly, the size of the discharge port can be reduced.

In Fig. 14 is shown another modification or means whereby the size of the discharge port through the nozzle can be regulated, and consists of a plug 13 screwing into the end of the opening in the nozzle and having passages therethrough and provided with a needle valve 14 projecting into the discharge passage in the plug. By shifting this needle valve 14 up and down the rate of discharge through the nozzle can be readily controlled.

Within the cup is arranged a plunger 15 adapted to be shifted lengthwise of the cup by suitably controlled resilient means. In the construction shown in Figs. 1, 5 and 7 the plunger is so connected to a rod 16 which extends through an externally threaded shaft 17, that the rod can rotate. The threads on this shaft are made of such a quick pitch that when force is applied to the shaft in the direction of its length, either the shaft or the nut through which it passes will tend to be rotated around the axis of the shaft.

In the construction shown in Figs. 1, 5 and 7 the rod 16 and the shaft 17 pass up through the top of the cup and through a nut mechanism which is internally threaded to correspond with the pitch of the threads on the shaft. This nut mechanism consists of an annular shell 18 having internal threads $a$ as described and an inclosing shell 19 provided with an inwardly projecting flange 20 resting on the top of the part 18. The nut thus formed has a seat 21 on top of the cup, the rotation of the nut in the seat on the cup being facilitated by the employment of anti-friction steel balls 22. A spring 23 is interposed between the lower end of the shaft 17 and the plunger 15, the tension of such spring being regulated in accordance with the pressure which it is desired to exert upon the lubricant in forcing it from the cup. A shifting spring 24 is interposed between the upper end of the cup and a shoulder or abutment 25 on the shaft 17. By the pressure of this spring exerted longitudinally on the shaft, the latter has a bias to move in the direction of its length, but as such movement is prevented by the engagement of the springs 23 and 24 therewith and with the plunger and cup a rotary movement will be imparted to the nut in a direction to permit of the inward movement of the shaft.

As will be readily understood by those skilled in the art, the pressure exerted upon the grease as long as the nut is free to rotate around the shaft, will be proportional to the tension of the spring 24 and would gradually decrease as such spring expands. Suitable means are however provided for locking the nut as against rotation around the shaft. This locking means is so constructed as to be tripped when the plunger has moved a certain predetermined distance under the action of the spring 23 away from the shaft and will be set to lock the shaft and nut together when the shaft has moved a predetermined distance towards the plunger compressing spring 23. As will be readily understood the pressure exerted upon the grease when the nut and shaft are locked together will be proportional to the tension of the pressure spring 23.

One form or construction of lock is shown in Figs. 1, 5, 7 and 12 and consists of a feather 26 formed on the rod 16 and extending into a radial slot in the shaft 17 sufficiently far to intersect the threads formed in this shaft. Notches are formed in the edge of this feather 26 spaced a distance apart equal to the distance between adjacent threads. Pins 27 preferably formed on the ends of screws are set in the inner wall of the shell 18 and project through the threads $a$ into the threads on the shaft 17. When the rod 16 has been shifted in the shaft 17 by the spring 23 so as to bring the notches in the feather into register with the threads in the shaft, the latter will be shifted longitudinally by the feed spring 24 the nut being free to rotate around the shaft. By this inward movement of the shaft by the spring 24 the pressure spring will be compressed, the plunger being in contact with the lubricant contained in the cup. The resistance presented by the lubricant will prevent a movement of the rod 16 with the shaft and the latter will move down relative to the rod, thereby causing the threads of the shaft to move out of register with the notches in the feather, and thereby prevent any rotation of the nut, as the pins 27 will strike against the feather as shown in Fig. 10. When one thread and pin 27 are used as shown in Fig. 5 the nut will be locked to the shaft by the feather in the manner described, on each revolution of the nut. By increasing the number of pins the arc of rotation of the nut can be correspondingly reduced as for instance by using four pins arranged around the shaft and engaging the feather at points 90° apart, the nut will make only one-fourth of a revolution. It is preferred however to construct the device with three or more independent threads on the shaft and a plurality of pins arranged around at different points. As for example in Figs. 1, 3, 7 and 10 the shaft is shown as formed with three threads and six pins arranged around at equally spaced points. In this construction with a pitch of about an inch and one eighth, a longitudinal movement of the shaft equal to about three sixteenths of an inch is permitted. In other words, in this construction the plunger is moved forward by the spring 24 three sixteenths of an inch at a time and between such movements of the plunger, the grease will be subjected to the pressure of the spring 23, the variation in such pressure being only such as will be incident to the expansion of the spring through three sixteenths of an inch. Such variations would be exceedingly small so that the pressure on the lubricant will be practically uniform at all times. By turning the nut in a reversed direction to the movement imparted by the shaft, the latter can be drawn back into the upper part of the cup to permit of recharging the latter, the plunger following the movement of the shaft by reason of the head 28 secured to the end of the rod and bearing on the shaft.

In order to hold the plunger in position at the upper end of the cup when it is desired to fill the same or to stop the feed of lubricant at any time, a spring actuated locking pin 29 is mounted in the nut and adapted to engage teeth 30 on the top of the cup. During the operation of the cup in feeding a lubricant this pin is held retracted or out of engagement with the teeth 30 by a cam surface 31 on the flange 20 of the shell 19, as will be seen by reference to Figs. 2 and 2ᵃ, the shell 19 with its flange being held on the part 18 of the cup by a pin 32 passing through a curved slot 33 in the top of the part 18 and screwing into the flange 20. As will be seen by reference to Fig. 2ᵃ this slot 33 is so arranged and proportioned as to length relative to that of the slot 34 through which the pin 29 passes, that the latter is held from coming in contact with the ends of its slot or reaching a position at which the part 19 can be removed from the part 18. By rotating this part 19 on the part 18, the cam portion 31 will pass along under the head of the pin 29 raising it or permitting it to drop or move down under the action of its spring.

As shown in Figs. 10 and 11 the feather 26 has those portions of it just below the notches rounded so that the lateral pressure of the pins 27 will tend to shift the feather and the rod 16 lengthwise of the shaft, thus facilitating the unlocking movement.

As will be readily understood by those skilled in the art, the main or principal function of the spring 24 is to effect the feed movement of the shaft 17. In the construction shown in Figs. 1, 5 and 7 the feed movement is due to the force applied to the shaft in the direction of its length, the shaft itself being held from rotation and the nut caused to rotate by the inclination of the sides of the threads on the shaft, engaging corresponding threads in the nut. By reference to Fig. 3ᵃ it will be observed that any longitudinal thrust of the shaft will be taken by the threads a of the nut and that the main function of the pins 27 is to coöperate with the feather 26 to lock the shaft and nut as against relative movement.

In the construction shown in Fig. 12 a clock spring 35 is employed to impart rotation of the nut around the shaft which is held from rotation by keys b engaging longitudinal grooves c in the shaft. In this construction the thrust due to the rotation of the nut when the plunger is in contact with the lubricant, will be outward, and an anti-friction bearing consisting of the balls 36 is interposed between a shoulder on the nut and the top wall of the cup. A disk 37 provided with a handle portion 38 is mounted on the top of the cup and is provided with a toothed portion 39, with which a pawl 40 mounted on the cup is held in engagement by spring 41. When the pawl is in engagement with this toothed portion the nut can be rotated to draw up the shaft and at the same time wind up the spring. During the normal operation of the cup and its mechanism, the pawl is held from engagement with the portion 39 by means of a pin 42 having an upturned end to engage the pawl and its head extending out through a ring 43 mounted on the cup and provided with a cam portion 44 to engage the head of the pin 42.

As shown in Fig. 14 the shaft itself may be rotated through a threaded neck 45 formed on the top of the cap. In this construction the shaft 17 is made preferably solid, or at least the rod 16 is omitted. The lower end of the shaft is provided with an inverted crown piece 46 having its periphery toothed and adapted to intermesh with a similarly toothed flange or ring 47 of the plunger 15. The spring 23 bears at its upper end against a ring 48 loosely mounted on the shaft 17 and the feed spring 24 bears against the top of this ring which is loosely mounted on the shaft as stated, and has an anti-friction bearing on top of the crown 46. The ring 48 is held from any rotary movement by the engagement of the springs 23 and 24 therewith and with the cup and plunger. By the longitudinal pressure applied to the shaft by the spring 24, the shaft will be rotated and caused to move down until the teeth on the crown 46 engage the teeth in the ring 47 thus locking the shaft as against rotation. The expansion of the spring 23, the shaft having been held stationary by engagement with the thread of the neck 45, will cause a disengagement of the teeth 46 and 48, thus permitting a rotation of the shaft and a consequent inner movement until the teeth on such parts will again engage.

In the construction shown in Figs. 14 and 15, the shaft is provided with a handle 65, whereby it may be rotated to move the plunger into the cap shaped top of the cup. Any suitable means may be employed for preventing the rotation of the shaft by the spring 24, either when the plunger is withdrawn into the cap, or at any time during the traverse of the plunger. A desirable construction consists of a spring actuated pawl 61 pivoted to the cap, and adapted to engage the toothed periphery of the ring 57 surrounding the shaft and provided with projections 58 engaging longitudinal grooves 59 in the shaft. During the normal operation of the lubricator the pawl is held out of engagement with the ring by a pin 62 in the pawl engaging an eccentric slot 63 in the disk 64, which is revolubly mounted on the protecting cap 60, covering the shaft locking parts.

In the construction shown in Figs. 1 and 2, it is possible to so turn the nut by hand that the pins 27 might be forced against the feather 26 sufficiently to injure the feather; and further when the locking pin 29 is withdrawn, the part 18 of the nut is free to be snapped around, causing the pins 27 to strike with considerable force against the feather. A construction is shown in Figs. 8 and 9 whereby such undesirable movements will be prevented. The sleeve 50 surrounding the part 18 is provided at its upper end with an inwardly projecting toothed flange 51 resting on the upper plate 52 of the part 18. A disk 53 is secured on the plate 52, and is recessed for the reception of a spring pawl 54 adapted to engage the teeth in flange 51. A head 55 is so connected to disk 53 as to be capable of rotation thereon by an annular key 56. This head has a curved slot 34 formed therein for the passage of the pin 29, and a cam surface 31 is formed on the head adjacent to the slot, for shifting the pin as described. In this construction the sleeve 50 can be turned in a direction to force pins 27 against the feather without shifting the part 18, but when turned in the opposite direction, it will be locked to the part 18 by the pawl 54.

It is characteristic of my improvement that the lubricant is subjected only to the pressure of the spring 23 which for convenience is termed the "pressure spring", the spring 24 termed the "feed spring" being operative only indirectly through the "pressure spring" on the lubricant. The spring 24 operates intermittently to restore the tension of the pressure spring, and as soon as such tension has been restored the feed spring is rendered inoperative by locking the shaft 17 as against inward movement. As the lubricant flows out the tension of the pressure spring drops, but as soon as the reduction of tension due to the movement of the plunger and expansion of the pressure spring, reaches a predetermined point, the feed spring is unlocked and again becomes operative to restore such tension. When the construction shown in Figs. 1 and 7 is employed the thread on the shaft having a pitch of one and one eighth inches, the plunger will have a movement of approximately three sixteenths (3/16) of an inch between each locking and unlocking of the "feed spring". By increasing the number of locking pins 27 around the shaft, the movement imparted to the plunger by each push or operation of the feed spring, can be decreased. As for example if twelve pins were properly arranged around the shaft as is possible by increasing the length of the nut, each movement of the plunger would be approximately three thirty-seconds (3/32) of an inch. As the slight variation in the pressure exerted by the pressure spring on the lubricant is proportional to the movement of the plunger between each compressive action of the feed spring, it is evident that by reducing the amount of each forward movement of the plunger, the variation of pressure exerted by the pressure spring will be reduced and such pressure will be practically constant.

In the construction shown in Fig. 12, the feed spring operates directly on the nut to rotate the same and force the shaft 17 inward. In this construction the nut operates to shift and control the shaft.

In the construction shown in Figs. 1, 5 and 7, the nut operates to control the inward movement of the shaft, such movement being effected by the feed spring. Where the nut is rotated to shift the shaft, the threads on the shaft and nut can be of any desired pitch.

I claim herein as my invention:

1. In a lubricator, the combination of a cup, a plunger, and resilient means intermittently operative for moving the plunger along the cup and against the lubricant and means for maintaining such movement approximately constant.

2. In a lubricator, the combination of a cup, a plunger, a spring for shifting said plunger along the cup, and automatic means for maintaining the tension of said spring approximately constant.

3. In a lubricator the combination of a cup, a plunger, a spring controlled means for shifting the plunger along the cup, and a spring for maintaining the tension of the pressure spring constant.

4. In a lubricator, the combination of a cup, a plunger, means for shifting the plunger, a threaded shaft for operating the plunger shifting means, a nut engaging the threaded shaft, and means for intermittently rotating one of said parts.

5. In a lubricator, the combination of a cup, a plunger, means for shifting the plunger, a threaded shaft for operating the plunger shifting means, a nut engaging said shaft, means for rotating one of said parts, and means controlled by the plunger for locking the nut and shaft as against relative movement.

6. In a lubricator, the combination of a cup, a plunger, a threaded shaft, a spring interposed between the shaft and plunger a nut engaging the shaft, and a spring for rotating one of said parts.

7. In a lubricator, the combination of a cup, a plunger, a threaded shaft, a spring interposed between the shaft and plunger, a nut engaging the shaft, a spring for rotating one of said parts and a lock operated by the plunger for holding the shaft and nut as against relative movement.

8. In a lubricator, the combination of a cup, a plunger, means for shifting the plunger, a threaded shaft for operating the plunger shifting means, a nut engaging said shaft, means for intermittently rotating one of said parts in one direction and means for rotating said part in the opposite direction to retract the plunger.

9. In a lubricator, the combination of a cup, a plunger, a threaded shaft, a spring interposed between the shaft and plunger, a nut engaging the shaft, a spring for rotating one of said parts, and means for preventing said part from rotation by said spring.

10. In a lubricator, the combination of a cup, a plunger, a threaded shaft, a spring interposed between the shaft and plunger, a nut engaging the shaft, a spring for rotating one of said parts, and a spring catch for preventing the rotation of said part by the spring and permitting its reverse rotation.

11. In a lubricator, the combination of a cup, a plunger, a threaded shaft, a nut carried by the cup, one of said parts being rotatable with reference to the other, a spring catch for locking said part as against rotation, and a cam plate for shifting said catch to inoperative position.

12. In a lubricator, the combination of a cup, a plunger, a hollow externally threaded shaft, a spring interposed between the shaft and plunger, a nut engaging the shaft, a spring for rotating the shaft, a rod connected to the plunger and extending through the shaft and a lock for holding the nut and shaft as against relative rotation operated by the rod.

13. In a lubricator, the combination of a cup, a plunger, a hollow threaded shaft provided with a radial slot intersecting the threads, a spring interposed between the shaft and plunger, a nut engaging the shaft provided with pins extending into the threads in the latter, a spring for rotating the nut, a rod extending through the shaft and provided with a feather extending out into the threads on the shaft and provided with notches spaced correspondingly to the threads on the shaft and movable by the plunger.

14. In a lubricator, the combination of a cup, a plunger, a hollow shaft provided with a plurality of threads and radially slotted, a spring interposed between the shaft and plunger, a nut engaging the shaft and provided with a plurality of pins projecting into the threads of the shaft, a spring for rotating the nut, a rod extending through the shaft and provided with a radial feather extending into the slot in the shaft and intersecting the threads and provided with notches spaced to correspond with the pitch of the threads.

15. In a lubricator, the combination of a cup, a plunger, a threaded shaft, a spring interposed between the shaft and plunger, a nut engaging the shaft and rotatably supported on the cup and a spring interposed between the cup and a shoulder on the shaft, and adapted to move the latter longitudinally.

16. In a lubricator, the combination of a cup, a plunger, resilient means arranged within the cup for moving the plunger along the same, and means also within the cup for maintaining such movement approximately constant.

17. In a lubricator, the combination of a cup, a plunger, means for moving the plunger along the cup, and means controlled by the plunger in its movement for controlling the operation of the plunger shifting means.

In testimony whereof, I have hereunto set my hand.

GEORGE RUSSELL KENNEDY.

Witnesses:
CHARLES BARNETT,
FRANCIS J. TOMASSON.